(12) United States Patent
Lien

(10) Patent No.: US 7,261,325 B2
(45) Date of Patent: Aug. 28, 2007

(54) STRUCTURES OF HOSES

(76) Inventor: Chien Ping Lien, 4F, No. 10, Lane 122, Sec 2, Kan-yuan Street, Shu Lin, Taipei Hsien (TW)

( * ) Notice: Subject to any disclaimer, the term of this patent is extended or adjusted under 35 U.S.C. 154(b) by 91 days.

(21) Appl. No.: 11/191,032

(22) Filed: Jul. 28, 2005

(65) Prior Publication Data
US 2006/0038042 A1 Feb. 23, 2006

(30) Foreign Application Priority Data
Aug. 19, 2004 (TW) .............................. 93213479 U

(51) Int. Cl.
*F16L 33/00* (2006.01)
(52) U.S. Cl. .................................... 285/247; 285/332.1
(58) Field of Classification Search ................ 285/247, 285/248, 249, 124.1, 332.1; 138/115, 111
See application file for complete search history.

(56) References Cited
U.S. PATENT DOCUMENTS

| | | | | | |
|---|---|---|---|---|---|
| 824,753 | A | * | 7/1906 | Stephens | ..................... 285/246 |
| 1,263,557 | A | * | 4/1918 | Hilton | ......................... 29/508 |
| 2,798,745 | A | * | 7/1957 | Nelson | .................. 285/148.13 |
| 3,408,099 | A | * | 10/1968 | Appleton | ..................... 285/247 |
| 3,625,257 | A | * | 12/1971 | Schroeder | ................... 138/109 |
| 4,399,319 | A | * | 8/1983 | Zinn | ........................... 174/47 |
| 4,975,055 | A | * | 12/1990 | LaPlante | ...................... 433/82 |
| 7,014,216 | B2 * | | 3/2006 | Mittersteiner et al. | ...... 285/247 |

* cited by examiner

*Primary Examiner*—David Bochna
(74) *Attorney, Agent, or Firm*—Bacon & Thomas, PLLC

(57) ABSTRACT

A hose includes a main passage defined longitudinally therethrough and a plurality of auxiliary passages are longitudinally defined in an inner periphery of the main passage and communicate with the main passage. At least one of the auxiliary passages is maintained in function when the hose is compressed or twisted. The hose is connected with a connector assembly which includes a tapered insertion with ridges extending radialy therefrom which are engaged with the auxiliary passages.

1 Claim, 2 Drawing Sheets

STRUCTURES OF HOSES

FIELD OF THE INVENTION

The present invention relates to a hose which includes a plurality of auxiliary passages defined axially in an inner periphery of the main passage of the hose so that when the hose is deformed or twisted, the fluid still flows through the auxiliary passages.

BACKGROUND OF THE INVENTION

A conventional hose for fluid passing therethrough generally is a circular hose with a circular outer periphery and a passage which is defined by a circular inner periphery. Fluid flows through the passage and can be sent to a remote position by the hose. However, the conventional hoses are made by flexible material which can be deformed, compressed and twisted, the inner diameter of the circular periphery becomes smaller if the hose is compressed and/or twisted. The inner periphery is even compressed to close the passage so that the volume of the fluid is not stable. Therefore, a protection sleeve is usually used to mount onto the hose and made by stiffer material such that the hose can be protected by the protection sleeve. The protection hose has to be made individually and increases the cost of the application composed of the hose and the protection sleeve.

The present invention intends to provide a hose which includes a plurality of auxiliary passages in an inner periphery of the main passage so as to maintain the normal function of the hose.

SUMMARY OF THE INVENTION

The present invention relates to a combination of a hose and a connector assembly, wherein the hose includes a main passage and a plurality of auxiliary passages are longitudinally defined in an inner periphery of the main passage and communicate with the main passage. The connector assembly includes an insertion which includes tapered outer periphery and has ridges extending radialy therefrom. The ridges are engaged with the auxiliary passages to form a seal-tight connection.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
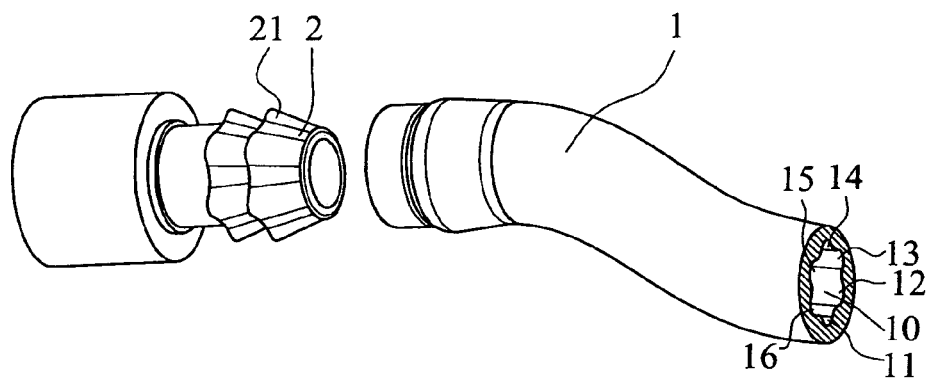
FIG. 1 is an exploded view to show the connector assembly and a hose of the present invention.
Figure 2:
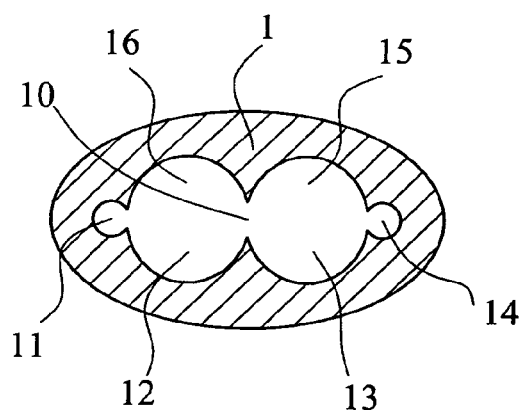
FIG. 2 shows that the hose is compressed while some of the auxiliary passages are in function.
Figure 3:
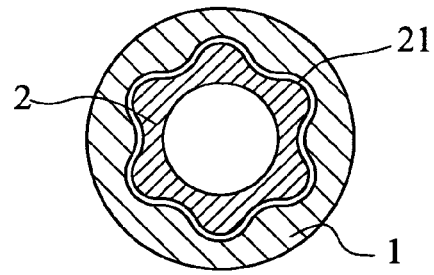
FIG. 3 is a cross sectional view to show the insertion engaged with the hose.

Referring to FIGS. 1 to 3, the hose 1 of the present invention comprises a main passage 10 defined longitudinally through the hose 1 and a plurality of auxiliary passages 11, 12, 13, 14, 15, 16 are longitudinally defined in an inner periphery of the main passage 10 and communicate with the main passage 10. When the hose 1 is compressed as shown in FIG. 2, the main passage 10 and the auxiliary passages 11 and 14 become smaller, the rest of the auxiliary passages 12, 13, 15, 16 are not affected so that fluid can flow through the hose 1 as expected.

The hose 1 can be connected with another hose or nozzle by using a connector assembly which includes an insertion 2 which is inserted into the hose 1 and includes two tapered sections connected with each other and each section has ridges 21 extending radialy therefrom. The ridges 21 are engaged with the auxiliary passages 11, 12, 13, 14, 15, 16 to form a seal-tight connection.

Figure 4:
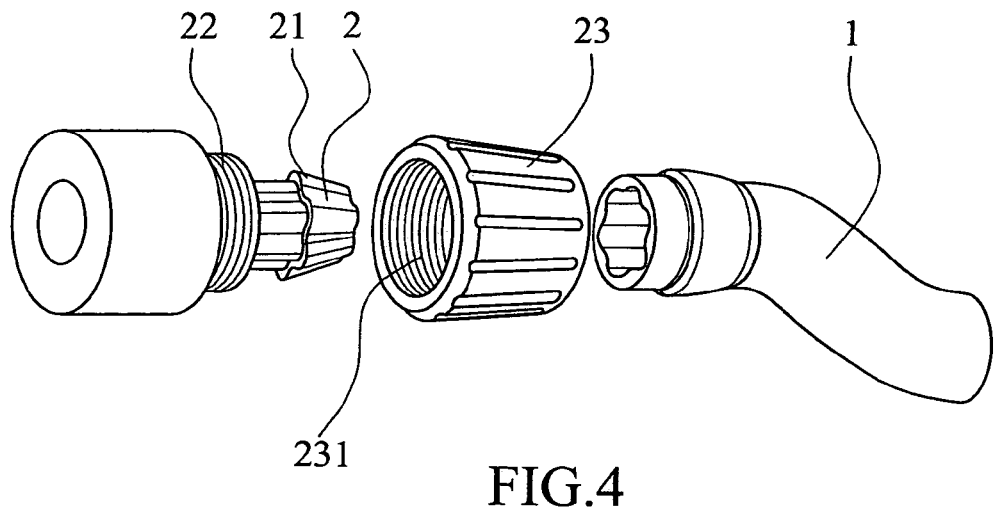
FIG. 4 is an exploded view to show another embodiment of the connector assembly and a hose of the present invention.
Figure 5:
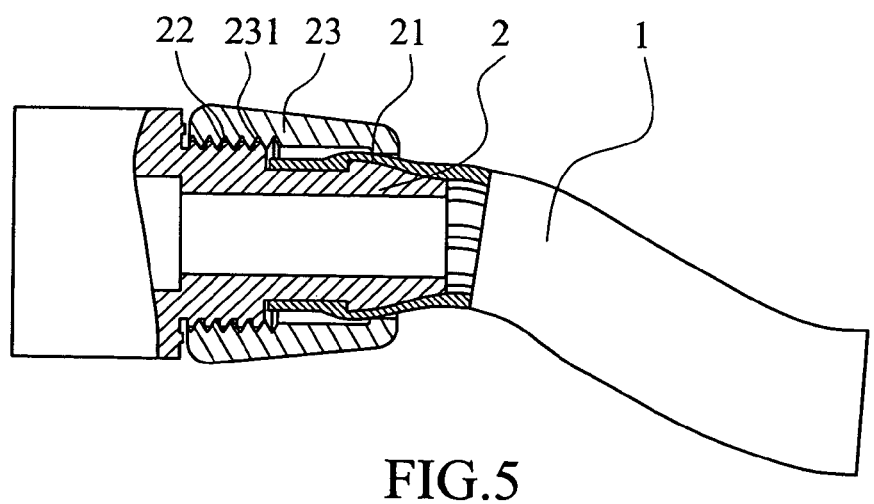
FIG. 5 is a cross sectional view to show the connection of the connector assembly and the hose in FIG. 4.

As shown in FIGS. 4 and 5, the insertion 2 includes a threaded outer periphery 22 and a locking sleeve 23 is used to connect the insertion 2 and the hose 1. The insertion 2 has a threaded outer periphery 22 and the locking sleeve 23 has a threaded inner periphery 231 which is engaged with the threaded outer periphery 22. An end of the hose 1 is inserted into locking sleeve 23 so that the inner periphery of the locking sleeve 23 presses the hose 1 to the insertion 2. Due to the engagement of the ridges 21 and the auxiliary passages 11, 12, 13, 14, 15, 16, the hose 1 is securely connected to the insertion 2.

While we have shown and described the embodiment in accordance with the present invention, it should be clear to those skilled in the art that further embodiments may be made without departing from the scope of the present invention.

What is claimed is:

1. A combination of a hose and a conector assembly, wherein the hose includes a main passage defined longitudinally through the hose, a plurality of auxiliary passages are longitudinally defined in an inner periphery of the main passage and communicate with the main passage, the connector assembly includes an insertion which includes a tapered outer periphery and has ridges extending radially therefrom, the ridges are engaged with the auxiliary passages; and wherein the insertion includes a threaded outer periphery and a locking sleeve has a threaded inner periphery which is engaged with the threaded outer periphery and presses the hose to the insertion.

* * * * *